Patented Dec. 4, 1923.

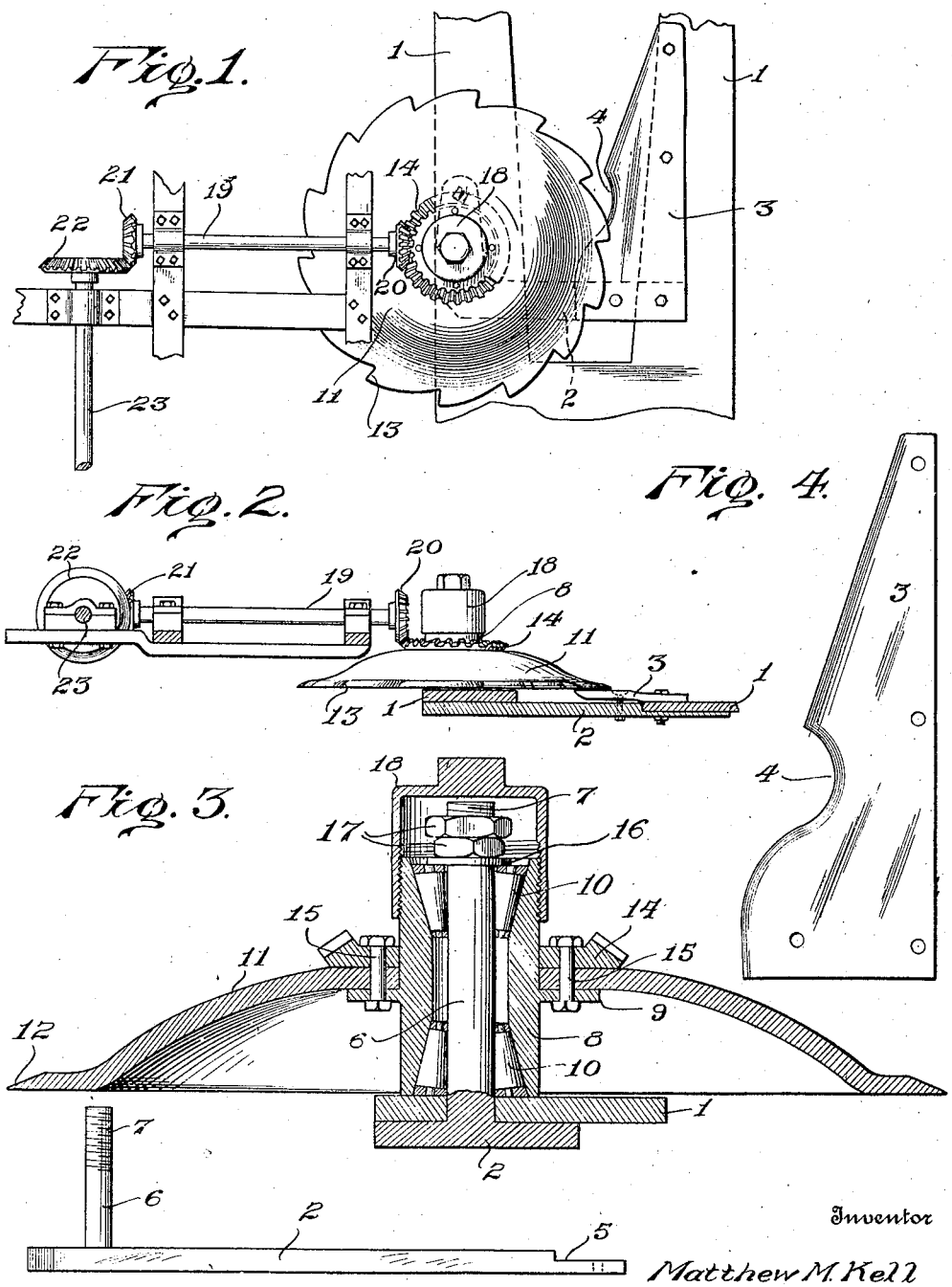

1,476,521

UNITED STATES PATENT OFFICE.

MATTHEW M. KELL, OF TULIA, TEXAS.

CUTTING MECHANISM FOR HARVESTERS.

Application filed August 20, 1921. Serial No. 493,888.

*To all whom it may concern:*

Be it known that I, MATTHEW M. KELL, a citizen of the United States, residing at Tulia, in the county of Swisher and State of Texas, have invented certain new and useful Improvements in Cutting Mechanism for Harvesters, of which the following is a specification.

This invention relates to harvesters and has special reference to the cutting mechanism of corn harvesters, the object of the invention being to produce a cutting mechanism which will operate continuously and will positively and effectually cut through the stalks of grain in such a manner that the stalks will move rearwardly to the elevator of the harvester. The invention also seeks to provide a cutting mechanism which may be readily applied to any corn harvester and which will operate easily without excessive friction, and the parts of which will be so arranged that repairs may be easily made when necessary.

The invention is illustrated in the accompanying drawings, in which—

Figure 1 is a plan view of a cutting mechanism embodying the invention;

Fig. 2 is a view partly in rear elevation and partly in transverse section of the cutting mechanism;

Fig. 3 is an enlarged vertical section through the main cutter and the mounting for the same;

Fig. 4 is an enlarged plan view of the stationary cutter;

Fig. 5 is a detail elevation of the supporting bar or bracket for the moving cutter.

In the drawings, the reference numeral 1 denotes the lifting fingers of a corn harvester which may be of the usual construction and which project forward from the main frame of the harvester and pass under and lift the stalks which may have fallen to the ground. In carrying out my invention, I secure to the under sides of the fingers a bracket or bar 2 which, as shown by the dotted lines in Fig. 1, bridges the space between the lifting fingers 1 and has a forwardly projecting arm at one end which is rigidly secured to the adjacent lifting finger. I also secure to the lifting finger more remote from the said forwardly projecting arm, a stationary knife 3 which has its cutting edge disposed between the lifting fingers and diverging rearwardly from the side of the said finger, as clearly shown. Near its rear wider end, an arcuate notch or recess 4 is formed in the cutting edge of the said knife to co-operate with the movable cutter as will presently more fully appear. The bracket 2 is recessed, as shown at 5, at one end so that it may engage against the edge of the adjacent lifting finger, and the stationary knife at its wider end rests upon and is secured to the said lifting finger and the upper side of the bracket 2, as clearly shown in Fig. 2. Upon the forwardly projecting arm of the bracket 2, I provide a vertical spindle 6 having its upper end threaded, as shown at 7. The movable cutter is mounted upon this spindle 6 and comprises a hub or shell 8 externally threaded at its upper end and provided intermediate its ends with an annular rib or flange 9, the bore of the hub or shell being flared at both ends so as to accommodate roller bearings 10, as shown and as will be readily understood. The roller bearings fit between the flared ends of the hub and the spindle 6 and thereby maintain the hub in a vertical position and reduce the frictional wear between the spindle and the hub. The movable cutter consists of a dome-shaped disc 11 having a central opening whereby it may be slipped over the hub 8 and rest upon the flange 9, the edge of the disc being beveled, as shown at 12, and formed into teeth 13 whereby an effective cutting edge is produced. A gear ring 14 is disposed around the hub 8 and rests upon the disc 11 at the center of the same and said gear ring and the disc are secured to the flange 9 by bolts 15 inserted therethrough, as shown in Fig. 3 and as will be readily understood. A washer 16 is fitted upon the spindle 6 over the upper bearings 10 and retaining nuts 17 are mounted upon the threaded end 7 of the spindle over the said washer so as to positively secure the hub and the bearings in position upon the spindle. A dust cap 18 is engaged over the upper threaded end of the hub and encloses the hub and the spindle and the parts mounted on the spindle so as to exclude dust and dirt which would interfere with the easy operation of the parts and create excessive wear between the contacting surfaces.

A transverse shaft 19 is mounted upon the frame of the harvester and is equipped at one end with a beveled pinion 20 which meshes with the gear ring 14 and at its opposite end is provided with a beveled pinion 21 meshing with a beveled gear 22 on the front end of the driving shaft 23. The driving shaft 23 is the same shaft which is now generally provided upon corn harvesters and is ordinarily equipped with a crank disc at its front end which crank disc is connected with a pitman to drive a reciprocating cutter.

It is thought the operation of the mechanism will be readily understood. It will be readily noted upon reference to Figs. 1 and 2 that a portion of the cutting edge of the disc 11 projects over the cutting edge of the stationary knife 3 and the parts are so proportioned and arranged that as each successive tooth 13 advances to the cutting position to engage a stalk the tooth will be opposite the base of the arcuate notch or recess 4 and the stalk will, consequently, be forced into said notch or recess so that it will be held by the same until the cutting tooth 13 passes through the stalk. The stalk will, therefore, be cut through cleanly and rapidly and, as the tooth moves rearwardly at the cutting point, it will push the lower end of the cut stalk rearwardly in the direction of the elevator of the harvester by which it is carried to the husking mechanism or to such other mechanism or point of delivery as may be featured in the machine to which the cutter is applied, the lower end of the elevator in practice being immediately adjacent the cutter.

It will be readily noted that I have provided an exceedingly simple cutting mechanism which will operate positively to sever the stalks as the machine is drawn over the field and as the movable cutter moves continuously in one direction the machine is freed from the jarring due to the use of a reciprocating cutter and caused by the stoppage and reversal of direction of movement by such cutter, the result being that less power is required to operate the machine and the life of the machine is prolonged. The particular shape of the rotating cutter tends to shed or turn aside any leaves or other parts which might otherwise accumulate upon the cutting mechanism and clog the action of the same. Should it be necessary to remove either cutter for any reason ready access may be had to the same and it will not be necessary to disassemble the entire mechanism.

Having thus described the invention, what is claimed as new is:

1. A cutting mechanism for harvesters comprising in combination a forwardly projecting stationary knife, a vertical spindle spaced laterally from said knife, a hub fitted vertically about said spindle, anti-friction bearings interposed between the ends of the spindle and the end of the hub, a dome-shaped cutting disc fitted concentrically upon said hub and having a portion of its cutting edge overlying the opposed edge of the stationary cutter, a gear ring resting centrally upon the dome-shaped disk about the hub, means for securing said gear ring and the disc to the hub, and means acting upon said gear ring to rotate the same, the hub and the disc.

2. A cutting mechanism for harvesters comprising in combination a stationary knife, a vertical spindle spaced from said knife, a vertically disposed hub encircling the spindle, anti-friction bearings interposed between the spindle and both ends of the hub, means upon the upper end of the spindle for retaining the bearings and the hub thereon, an annular flange upon the hub intermediate the ends thereof, a dome-shaped cutting disc fitted centrally upon the hub and resting upon said flange and having its cutting edge overlying the stationary knife, a gear ring resting upon the said disc at the center thereof about the hub, means for securing said gear ring and said disc to the flange on the hub, and a dust cap mounted on the upper end of the hub.

In testimony whereof I affix my signature.

MATTHEW M. KELL. [L. S.]